United States Patent
Day et al.

(10) Patent No.: US 6,925,519 B2
(45) Date of Patent: Aug. 2, 2005

(54) AUTOMATIC TRANSLATION FROM SCSI COMMAND PROTOCOL TO ATA COMMAND PROTOCOL

(75) Inventors: Brian A. Day, Colorado Springs, CO (US); Timothy E. Hoglund, Colorado Springs, CO (US); Ganesan Viswanathan, Norcross, GA (US); Ayyavu Vetrivel, Norcross, GA (US)

(73) Assignee: LSI Logic Corporation, Milpitas, CA (US)

( * ) Notice: Subject to any disclaimer, the term of this patent is extended or adjusted under 35 U.S.C. 154(b) by 448 days.

(21) Appl. No.: 10/202,774

(22) Filed: Jul. 25, 2002

(65) Prior Publication Data

US 2004/0019734 A1 Jan. 29, 2004

(51) Int. Cl.[7] .............................................. G06F 13/00
(52) U.S. Cl. ....................................... 710/315; 710/74
(58) Field of Search ................................ 710/305, 306, 710/315, 72, 74

(56) References Cited

U.S. PATENT DOCUMENTS

| | | | | |
|---|---|---|---|---|
| 5,920,884 A | * | 7/1999 | Jennings et al. ............ | 711/102 |
| 6,098,114 A | * | 8/2000 | McDonald et al. ............ | 710/5 |
| 6,115,771 A | | 9/2000 | Born | |
| 2003/0182455 A1 | * | 9/2003 | Hetzler et al. ............... | 709/250 |
| 2003/0188080 A1 | * | 10/2003 | Olarig ......................... | 710/313 |
| 2004/0010660 A1 | * | 1/2004 | Konshak et al. ............. | 711/114 |

OTHER PUBLICATIONS

"PCI–X Addendum to the PCI Local Bus Specification", Revision 1.0a, Jul. 24, 2000, 20 pages.

"Serial ATA: High Speed Serialized AT Attachment", Revision 1.0, Aug. 29, 2001, 3 pages.

"Information Technology—SCSI-3 Block Commands (SBC)", Revision 8c, Nov. 13, 1997, 11 pages.

"AMBA™ Specification", Revision 2.0, May 13, 1999, 230 pages.

* cited by examiner

*Primary Examiner*—Glenn A. Auve
(74) *Attorney, Agent, or Firm*—Christopher P. Maiorana, P.C.

(57) ABSTRACT

A device generally comprising a first circuit and a second circuit. The first circuit may be configured to (i) communicate with a host via a first bus (ii) using a small computer system interface (SCSI) protocol having a plurality of command descriptor blocks. The second circuit configured to (i) communicate with a remote device with a via a second bus, (ii) using an advanced technology attachment (ATA) protocol and (iii) translate a subset of the command descriptor blocks to the ATA protocol in application specific hardware.

19 Claims, 4 Drawing Sheets

ATA

| | CURRENT VALUE 126 | PREVIOUS VALUE 125 |
|---|---|---|
| 128a TASK FILE REG 0 | DATA | |
| TASK FILE REG 1 | ERROR / FEATURE | |
| TASK FILE REG 2 | SECTOR COUNT [7:0] | SECTOR COUNT [15:8] |
| TASK FILE REG 3 | LBA [7:0] | LBA [31:24] |
| TASK FILE REG 4 | LBA [15:8] | LBA [39:32] |
| TASK FILE REG 5 | LBA [23:16] | LBA [47:40] |
| TASK FILE REG 6 | DEVICE | |
| 128h TASK FILE REG 7 | COMMAND / STATUS | |

SCSI

| BYTE 0 | OPERATION CODE |
|---|---|
| BYTE 1 | PARAMETER BYTE 1 |
| BYTE 2 | PARAMETER BYTE 2 |
| ... | ... |
| BYTE N | PARAMETER BYTE N |
| BYTE N+1 | CONTROL BYTE |

AUTOMATIC TRANSLATION FROM SCSI COMMAND PROTOCOL TO ATA COMMAND PROTOCOL

FIELD OF THE INVENTION

The present invention relates to a bus protocol translation generally and, more particularly, to an automatic translation from a small computer system interface command protocol to an advanced technology attachment command protocol.

BACKGROUND OF THE INVENTION

A tremendous amount of software currently exists for controlling remote devices such as hard drives and input/output devices using a small system computer interface (SCSI) protocol over a SCSI bus. However, a growing number of low cost, high performance remote devices are entering the market using an advanced technology attachment (ATA) protocol on a Serial ATA (SATA) bus. Compatibility issues between the SCSI protocol and the ATA protocol commonly cause the users to choose between protocols. As such, a means of allowing users to maintain existing SCSI software infrastructure while utilizing cost efficient Serial ATA remote storage devices would be useful.

SUMMARY OF THE INVENTION

The present invention concerns a device generally comprising a first circuit and a second circuit. The first circuit may be configured to (i) communicate with a host via a first bus (ii) using a small computer system interface (SCSI) protocol having a plurality of command descriptor blocks. The second circuit configured to (i) communicate with a remote device with a via a second bus, (ii) using an advanced technology attachment (ATA) protocol and (iii) translate a subset of the command descriptor blocks to the ATA protocol in application specific hardware.

The objects, features and advantages of the present invention include providing a method and/or architecture that may provide for (i) compatibility with legacy SCSI software, (ii) a growth path to new SATA remote devices, (iii) fast translations of commonly used SCSI commands into an ATA protocol, (iv) efficient conversions of SCSI commands into the ATA protocol, and/or (iv) programmable translations of SCSI commands into the ATA protocol.

BRIEF DESCRIPTION OF THE DRAWINGS

These and other objects, features and advantages of the present invention will be apparent from the following detailed description and the appended claims and drawings in which:

FIG. 2 is a diagram of a basic format for an ATA command;

FIG. 3 is a diagram of basic format for a SCSI command descriptor block;

DETAILED DESCRIPTION OF THE PREFERRED EMBODIMENTS

Figure 1:
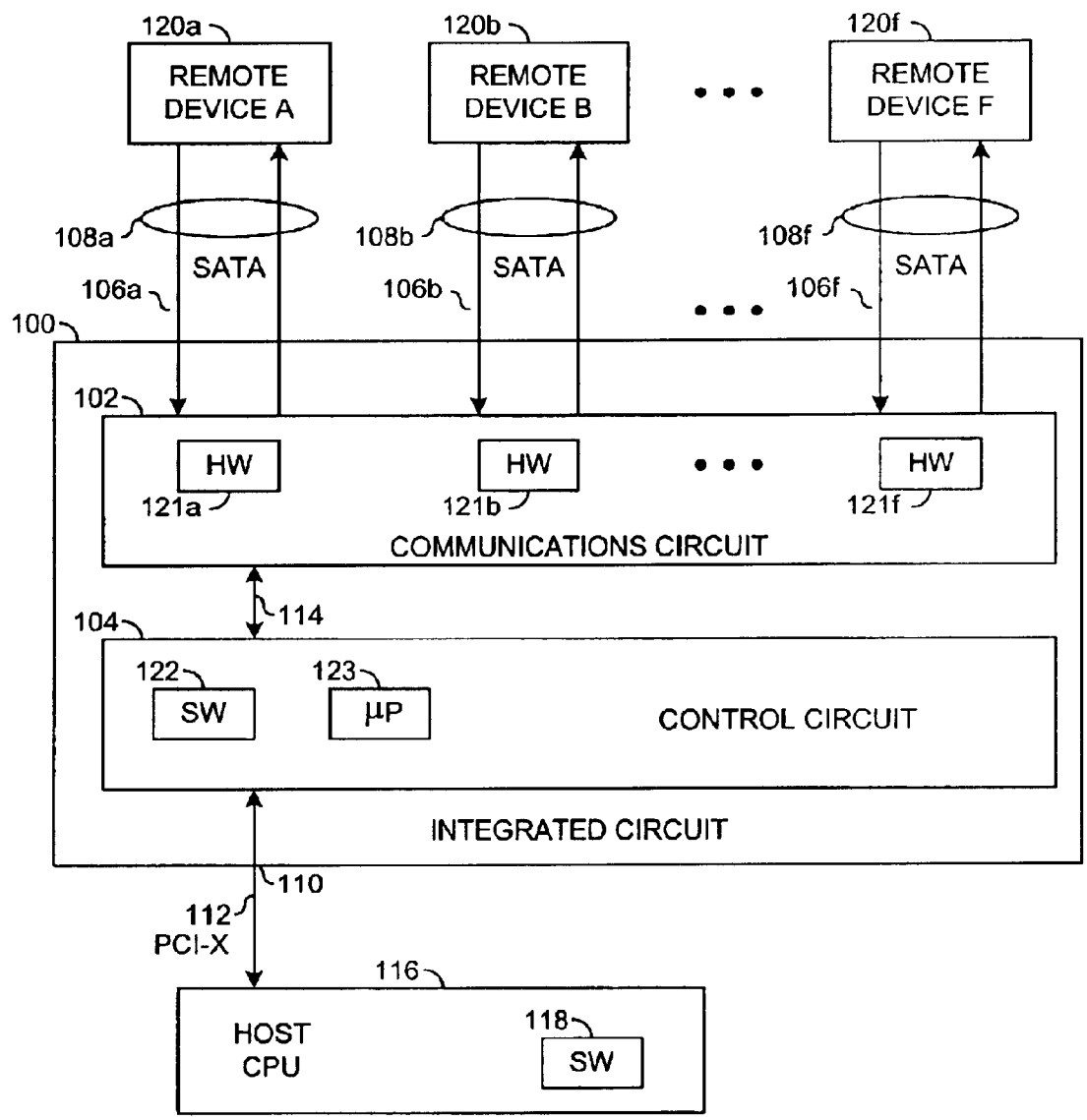
FIG. 1 is a block diagram of a circuit in accordance with a preferred embodiment of the present invention.

Referring to FIG. 1, a block diagram of a device or circuit 100 is shown in accordance with a preferred embodiment of the present invention. The circuit 100 may be configured to translate commands and data received from a host bus in one protocol to commands and data in another protocol for use on an input/output (I/O) bus. In one embodiment, the circuit 100 may be implemented as a single integrated circuit or chip. Other implementations using multiple component designs may be provided for to meet the design criteria of a particular application.

The circuit 100 generally comprises a communications circuit 102 and a control circuit 104. Multiple interfaces 106a–f may be provided in the communications circuit 102 to interface with multiple I/O buses 108a–f. An interface 110 may be provided in the control circuit 104 to interface to a host bus 112. A link 114 may be provided between the communications circuit 102 and the control circuit 104.

The host bus 112 may be connected to one or more host central processor units (CPU) 116. Each host CPU 116 may include software or code 118 in communication with the circuit 100. The I/O busses 108a–f may be connected to remote devices 120a–f. Each remote device 120a–f may be implemented as a mass storage device, an I/O device, or the like. The circuit 100 may operate as a host controller for the remote devices 120a–f.

Each I/O bus 108a–f may be implemented as a Serial Advanced Technology Attachment (SATA) bus. The SATA buses may comply with the "Serial ATA: High Speed Serialized AT Attachment" specification, Revision 1.0, Aug. 29, 2001, published by the Serial ATA Workgroup, Santa Cruz, Calif., and hereby incorporated by reference in its entirety. Communications via each SATA bus 108a–f between the remote devices 120a–f and the circuit 100 may be defined by the "Information Technology—AT Attachment with Packet Interface-6 (ATA/ATAPI-6)" working draft document, T13/1410D, Revision 3b, Feb. 26, 2002, published by the American National Standards Institute, Inc., New York, N.Y., and hereby incorporated by reference in its entirety. Other serial busses and protocol may be implemented to meet the design criteria of a particular application.

The host bus 112 may be implemented as a Peripheral Component Interconnect Extended (PCI-X) bus. The PCI-X bus 112 may comply with the "PCI-X Addendum to the PCI Local Bus Specification", Revision 1.0a, Jul. 24, 2000, published by the PCI Special Interest Group, Portland Oreg., and hereby incorporated by reference in its entirety. Communications via the parallel PCI-X bus 112 between the software 118 and the circuit 100 may be compliant with the "Information Technology—SCSI-3 Block Commands (SBC)" specification, NCITS 306, revision 8c, Nov. 13, 1997, published by the American National Standards Institute, Inc., New York, N.Y., and hereby incorporated by reference in its entirety. Other parallel busses and protocol may be implemented to meet the design criteria of a particular application.

The software 118 generally uses SCSI Command Descriptor Blocks (CDB) to send I/O commands to the remote devices 120a–f, such as disk drives. The circuit 100 may provide application specific hardware circuits 121a–f that may automatically translate a subset of the SCSI CDB command formats to ATA command formats prior to sending to the remote devices 120a–f. The subset of SCSI CDBs may be determined by an effect on a main performance path. In one embodiment, the SCSI READ(6), READ(10), WRITE (6), WRITE(10) commands may be automatically translated by hardware within the circuit 100. All other SCSI CDBs may be converted by firmware, software or code 122 executed by a microprocessor 123, instead of translation by the application specific hardware 121a–f. Translating with the code 122 generally allows for flexibility since the code 122 may be changed without affecting main performance. Other translation allocations between the application specific hardware 121a–f and the code 122 may be implemented to meet the design criteria of a particular application.

In operation, the host CPU 116 may generate and present an SCSI CDB to the control circuit 104 via the host bus 112. The control circuit 104 may determine if the SCSI CDB should be translated by the microprocessor 123 or by one of the application specific hardware circuits 121a–f. Where the SCSI CDB may be part of a predetermined set of SCSI commands that are hardware translated, the control circuit 104 may pass the SCSI CDB unaltered to the communications circuit 102 via the link 114. Thereafter, an application specific hardware circuit 121a–f may translate the SCSI CDB into an ATA task file structure. The communications circuit 102 may transfer the resulting ATA command to the respective remote device 120a–f on a respective I/O bus 108a–f.

Where the SCSI CDB may be part of a set of SCSI commands that are software translated, the microprocessor 123 may convert the SCSI CDB into the ATA command format as instructed by the code 122. The ATA command information may then be transferred to the communications circuit 102 by the link 114. Finally, the communications circuit 102 may pass the ATA command to the respective remote device 120a–f on the respective I/O bus 108a–f.

Referring to FIG. 2, a diagram of a basic format for an ATA command 124 is shown. The basic ATA command 124 generally comprises two values 125 and 126 allocated among sixteen byte-wide words. The first value 125 may contain upper address bits for a logical block address (LBA) and upper bits of a sector count. The second value 126 may contain the lower address bits for the LBA address, the lower bits of the sector count, data, an error/feature word, a device word, and a command/status word. A specific format may be provided for each particular type of ATA command.

The words of the ATA command 124 generally map to eight task file registers 128a–h, Each conventional task file register 128a–h generally accepts a write of one byte at a time per the ATA standard. Furthermore, each conventional task file register 128a–h may store two bytes simultaneously. For example, when the first value 125 may be written to the registers 128a–h, the first value 125 may be stored as a current value. A subsequent write of the second value 126 to the same registers 128a–h may cause the first value 125 to be transferred and stored as a previous value while the second value 126 may be stored as the current value. In the application specific hardware circuit 121a–f, the first value 125 and the second value 126 may be written into the task file registers 128a–h independent of each other. For example, each application specific hardware circuit 121a–f may translate a SCSI CDB and then simultaneously write both the first value 125 and the second value 126 into the task file registers 128a–h. In another example, each application specific hardware circuit 121a–f may translate a SCSI CDB and then write the first value 125 and the second value 126 into the task file registers 128a–h sequentially in any order.

Referring to FIG. 3, a diagram of a basic format for a SCSI CDB 130 is shown. Each SCSI CDB 130 generally comprises an operation code, N parameter bytes, and a control byte. Values of the parameter bytes may be specific to a type of command specified in the operation code (OpCode). In general, SCSI CDBs may be either six, ten, or twelve bytes in length, again depending on the command specified in the operation code.

Figure 4:
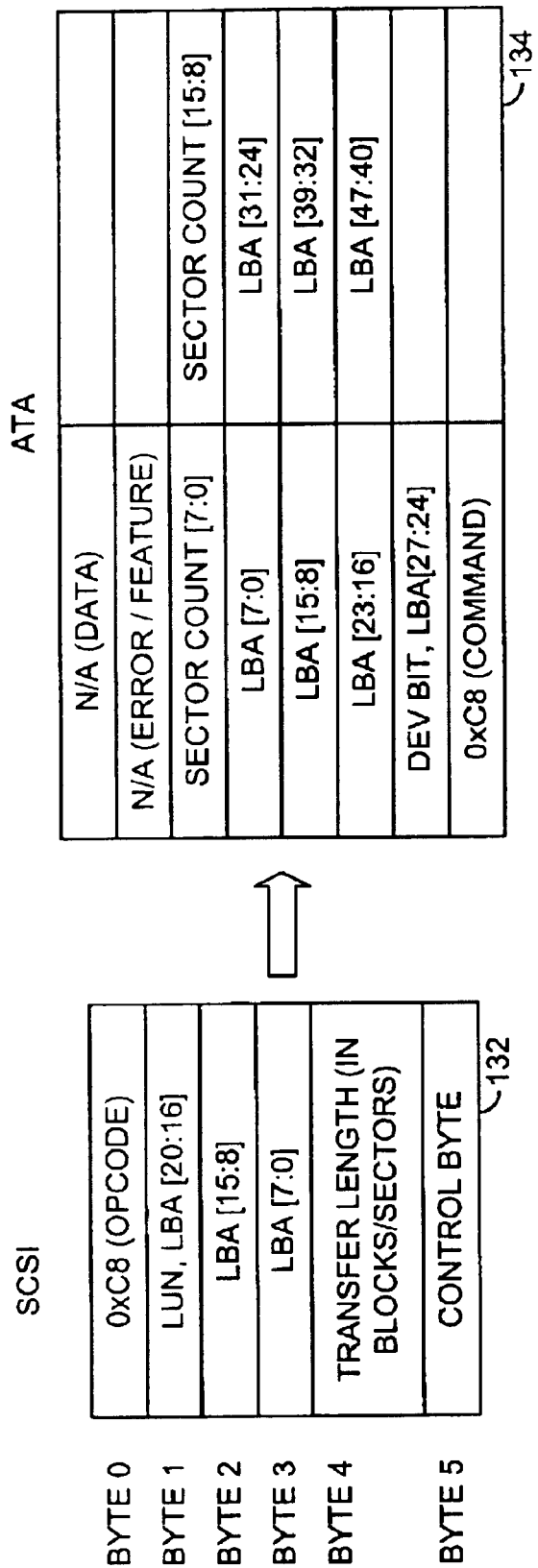
FIG. 4 is a diagram of a format for a SCSI READ(6) command descriptor block and an ATA READ direct memory access command.

Referring to FIG. 4, a diagram of a format for a SCSI READ(6) CDB 132 and an ATA READ DMA command 134 are shown. The application specific hardware circuits 121a–f within the circuit 100 generally translate the SCSI OpCode (e.g., "0x08") to the ATA Command (e.g., "0xc8"). Furthermore, the application specific hardware circuits 121a–f may translate and expand a 21-bit SCSI LBA address into a 48-bit ATA LBA address. The application specific hardware circuits 121a–f may also generate and set the sector count and device (DEV) bit in the ATA READ DMA command 134. Translations by the application specific hardware circuits 121a–f within the circuit 100 may be unidirectional from the SCSI format to the ATA format. The translations may also be to an EXTENDED and/or a QUEUED versions of the ATA READ DMA and an ATA WRITE DMA commands by programming the register bits (i) Queuing_enabled and (ii) Ext_cmds_enabled in the application specific hardware circuits 121a–f, see Table II for an example. Furthermore, the translations may map several of the SCSI OpCodes to each of the ATA commands.

Figure 5:
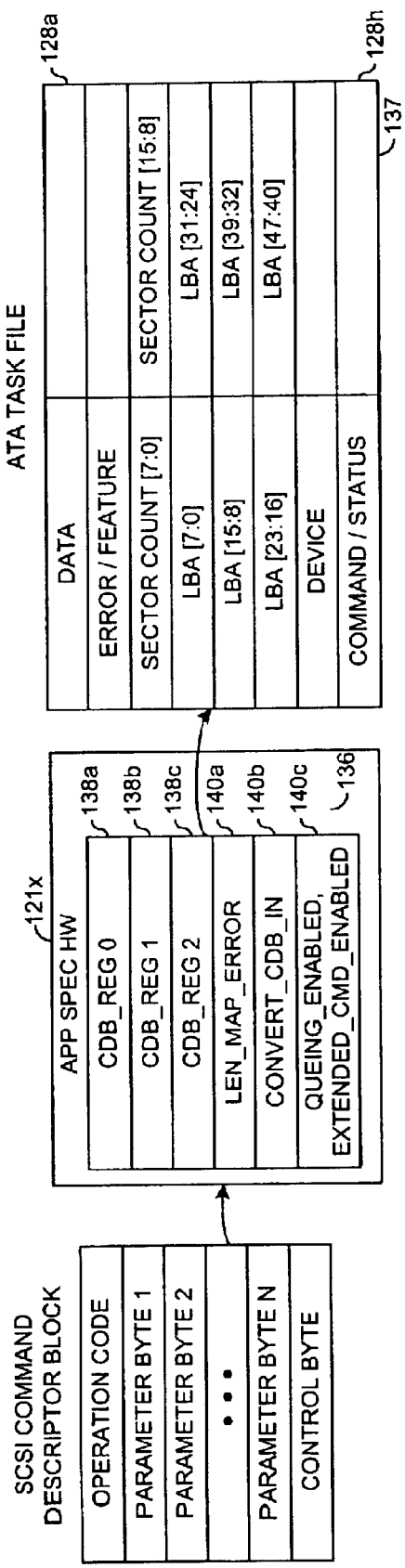
FIG. 5 is a block diagram illustrating a translation of a SCSI command descriptor block into an ATA command.

Referring to FIG. 5, a block diagram illustrating a translation of a 6-byte SCSI CDB into an ATA command is shown. The conversion may be performed independently by any of the application specific hardware circuits 121a–f receiving the SCSI CDB. Furthermore, each of the application specific hardware circuits 121a–f may translate concurrently. Each application specific hardware circuit 121x (where a≦x≦f) generally comprises a bank of memory locations or memory elements 136 coupled to an ATA task file 137. The ATA task file 137 generally comprises the task file registers 128a–h. The memory elements 136 generally comprise several multi-bit registers 138a–c and several elements 140a–c.

In one embodiment, each of the registers 138a–b may store 32-bits of information. For example, the register 138a may be arranged as a four-byte register (e.g., cdb_reg0 [31:0]). The second register 138b may also be a four-byte register (e.g., cdb_reg1 [31:0]). The third register 138c may be a two-byte to four-byte register (e.g., cbd_reg2 [31:0]). The register 138a–c may form a continuous block of addressable memory into which the six-byte and ten-byte SCSI CDBs may be written for hardware translation. Table I provides an example mapping of the registers 138a–c to the different size SCSI CDBs as follows:

TABLE I

| Registers 138a-c | 6-Byte SCSI CDB | 10-Byte SCSI CDB |
|---|---|---|
| cdb_reg0 [7:0] | OpCode | OpCode |
| cdb_reg0 [15:8] | LBA [20:16] | DPO/FUA/RELADR |
| cdb_reg0 [23:16] | LBA [15:8] | LBA [31:24] |
| cbd_reg0 [24:31] | LEA [7:0] | LBA [23:16] |
| cdb_reg1 [7:0] | Trans Length [7:0] | LBA [15:8] |
| cdb_reg1 [15:8] | Control | LBA [7:0] |
| cdb_reg1 [23:16] | N/A | Reserved |
| cdb_reg1 [31:24] | N/A | Trans Length [15:8] |
| cdb_reg2 [7:0] | N/A | Trans Length [7:0] |
| cbd_reg2 [15:8] | N/A | Control |

The single-bit memory element 140a may store a temporary variable used to indicate a present or absence of a transfer length mapping error (e.g., len_map_error). The single-bit memory element 140b may store a true/false logic value used in converting the length of the READ(10) or WRITE(10) SCSI CDBs (e.g., convert_cdb_in). The twobit memory element 140c may store parameters for converting the SCSI CDB opcodes to the ATA opcodes. Other arrangements of the memory 136 may be implemented to meet the design criteria of a particular application.

The pseudo code shown below generally provides an example of the application specific hardware translations of the LBAs and the transfer lengths. Other parameters may be translated in a similar fashion. As the pseudo code may be an example only, other hardware translation implementations may be provided within the scope of the present invention. The pseudo code example may be as follows:

```
//Convert SCSI CDB OpCode byte into ATA Command byte
case ({queuing_enabled,ext_cmds_enabled,cdb_reg0[7:0]})
//With Task File Queuing disabled and Extended Commands disabled
//SCSI READ(6) and READ(10) to ATA READ DMA
10'b0_0_0000_1000,
10'b0_0_0010_1000: begin
        ata_cmd = 8'hC8;//READ_DMA;
    end
//SCSI WRITE(6) and WRITE(10) to ATA WRITE DMA
10'b0_0_0000_1010,
10'b0_0_0010_1010: begin
        ata_cmd = 8'hCA;//WRITE_DMA;
    end
//With Task File Queuing disabled and Extended Commands enabled
//SCSI READ(6) and READ(10) to ATA READ DMA EXT
10'b0_1_0000_1000,
10'b0_1_0010_1000: begin
        ata_cmd = 8'h25;//READ_DMA_EXT;
    end
//SCSI WRITE(6) and WRITE(10) to ATA WRITE DMA EXT
10'b0_1_0000_1010,
10'b0_1_0010_1010: begin
        ata_cmd = 8'h35;//WRITE_DMA_EXT;
    end
//With Task File Queuing enabled and Extended Commands disabled
//SCSI READ(6) and READ(10) to ATA READ DMA QUEUED
10'b1_0_0000_1000,
10'b1_0_0010_1000: begin
        ata_cmd = 8'hC7;//READ_DMA_QUEUED;
    end
//SCSI WRITE(6) and WRITE(10) to ATA WRITE DMA QUEUED
10'b1_0_0000_1010,
10'b1_0_0010_1010: begin
        ata_cmd = 8'hCC;//WRITE_DMA_QUEUED;
    end
//With Task File Queuing enabled and Extended Commands enabled
//SCSI READ(6) and READ(10) to ATA READ DMA QUEUED
EXTENDED
10'b1_1_0000_1000,
10'b1_1_0010_1000: begin
        ata_cmd = 8'h26;//READ_DMA_QUEUED_EXT;
    end
//SCSI WRITE(6) and WRITE(10) to ATA WRITE DMA QUEUED
EXTENDED
10'b1_1_0000_1010,
10'b1_1_0010_1010: begin
        ata_cmd = 8'h36;//WRITE_DMA_QUEUED_EXT;
    end
endcase
//Determine LBA and Transfer Length format to use
case (cdb_reg0 [7:0])
//SCSI READ(6) and WRITE(6)
    8'h08, 8'h0a : begin
        ata_lba = {24'h0, (cdb_reg0 [15:8] & 8'h1f), cdb_reg0
            [23:16], cdb_reg0 [31:24]};
        // zero length OK, means 256 for both SCSI and ATA
        ata_len = {8'h0, cdb_reg1[7:0]};
        len_map_error = 1'b0;
    end
//SCSI READ(10) and WRITE(10)
    8'h28, 8'h2a : begin
        ata_lba = { 16'h0, cdb_reg0[23:16], cdb_reg0[31:24],
            cdb_reg1[7:0], cdb_reg1[15:8]};
        // zero length NOT OK, different meaning for SCSI and ATA
        if ( ( ( | ({cdb_reg1[31:24], cdb_reg2[7:0]}) ) )
            begin
                ata_len = {cdb_reg1[31:24], cdb_reg2[7:0]};
                len map error = 1'b0;
            end
        else
            begin
                if (convert_cdb_in)
                    begin
                        len_map_error = 1'b1;
                        ata_len = 16'b0;
                    end
                else
                    begin
                        len_map_error = 1'b0;
                        ata_len = {cdb_reg1[31:24], cdb_reg2[7:0]};
                    end
            end
    end
    default    : begin
        ata_lba [47:0] = 48'b0;
        ata_len [15:0] = 16'b0;
        if (convert_cdb_in)
            len_map_error = 1'b1;
        else
            len_map_error = 1'b0;
    end
endcase
```

Table II generally provides a summary of the SCSI read to ATA read opcode conversions from the above pseudo code example as follows:

TABLE II

| SCSI Opcode | Queuing_enabled | Ext_cmds_enabled | ATA Opcode |
|---|---|---|---|
| 0X08 (SCSI Read) | 1'b0 | 1'b0 | 0xC8 (Read DMA) |
| 0X08 (SCSI Read) | 1'b0 | 1'b1 | 0x25 (Read DMA Ext) |
| 0X08 (SCSI Read) | 1'b1 | 1'b0 | 0xC7 (Read DMA Queued) |
| 0X08 (SCSI Read) | 1'b1 | 1'b1 | 0x26 (Read DMA Queued Ext) |

Data written into the registers 138a–c in the SCSI protocol may be converted by the hardware as described above and written directly to the associated ATA task file 137. Since a transfer of data from the registers 138a–c to the ATA task file registers 128a–h may not be governed by the ATA protocol, the transfers generally need not use the conventional previous write then current write sequence. For example, a translation by the application specific hardware circuit 121x of the LBA value from the SCSI CBD may result in a simultaneous storing into all six of the LBA bytes within the ATA task file registers 128d–f. Once the ATA task file registers 128a–h have the translated command information, the ATA task file registers 128a–h may be transmitted to the associated remote device 120a–f as an ATA command 124.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

What is claimed is:

1. A device comprising:
   a first circuit configured to communicate with a host via a first bus using a small computer system interface (SCSI) protocol having a plurality of command descriptor blocks, wherein said first bus is a parallel bus; and
   a second circuit configured to (i) communicate with a remote device via a second bus using an advanced technology attachment (ATA) protocol and (ii) translate a subset of said command descriptor blocks to said ATA protocol in application specific hardware.

2. The device according to claim 1, wherein said second bus is a serial bus.

3. The device according to claim 1, wherein said second circuit comprises a plurality of registers configured to receive said command descriptor blocks.

4. The device according to claim 3, wherein said second circuit further comprises an ATA task file coupled to said plurality of registers.

5. The device according to claim 4, wherein said ATA task file comprises a previous value and a current value that may be written to simultaneously by said application specific hardware.

6. The device according to claim 1, wherein said first circuit comprises a processor configured to translate at least one of said command descriptor blocks outside of said subset from said SCSI protocol to said ATA protocol.

7. The device according to claim 6, wherein said processor is further configured to direct said subset of said command descriptor blocks to said second circuit for translation.

8. The device according to claim 1, wherein said second circuit is coupled to a plurality of said remote devices via a plurality of said second busses.

9. The device according to claim 8, wherein said second circuit comprises a plurality of third circuits each configured to translate said subset of said command descriptor blocks.

10. A method for translating from a host to a remote device, comprising the steps of:
   (A) communicating with said host via a first bus using a small computer system interface (SCSI) protocol having a plurality of command descriptor blocks, wherein said first bus is a parallel bus;
   (B) communicating with said remote device via a second bus using an advanced technology attachment (ATA) protocol; and
   (C) translating a subset of said command descriptor blocks to said ATA protocol in application specific hardware.

11. The method according to claim 10, further comprising the step of translating at least one of said command descriptor blocks to said ATA protocol using code.

12. The method according to claim 11, wherein the step of translating said subset is uni-directional from said SCSI protocol to said ATA protocol.

13. The method according to claim 10, wherein said subset consists of (i) a plurality of read command descriptor blocks and (ii) a plurality of write command descriptor blocks.

14. The method according to claim 13, wherein the step of translating said subset generates extended types of direct memory access ATA commands.

15. The method according to claim 13, wherein the step of translating said subset generates queued types of direct memory access ATA commands.

16. The method according to claim 10, wherein the step of translating said subset comprises the sub-steps of:
   writing a first command descriptor block from said subset to a plurality of registers; and
   translating said first command descriptor block to an ATA command in response to said writing.

17. The method according to claim 10, wherein the step of translating said subset further comprises the sub-step of expanding an address size within said SCSI protocol to generate an ATA command.

18. The method according to claim 17, wherein the step of translating said subset further comprises the sub-step of mapping a plurality of operational codes from said SCSI protocol to a single command in said ATA protocol.

19. A device comprising:
   means for communicating with a host via a first bus using a small computer system interface (SCSI) protocol having a plurality of command descriptor blocks, wherein said first bus is a parallel bus;
   means for communicating with a remote device via a second bus using an advanced technology attachment (ATA) protocol; and
   means for translating a subset of said command descriptor blocks to said ATA protocol in application specific hardware.

* * * * *